G. C. AVERY.
Corn Planter.
No. 78,638.
Patented June 9, 1868.
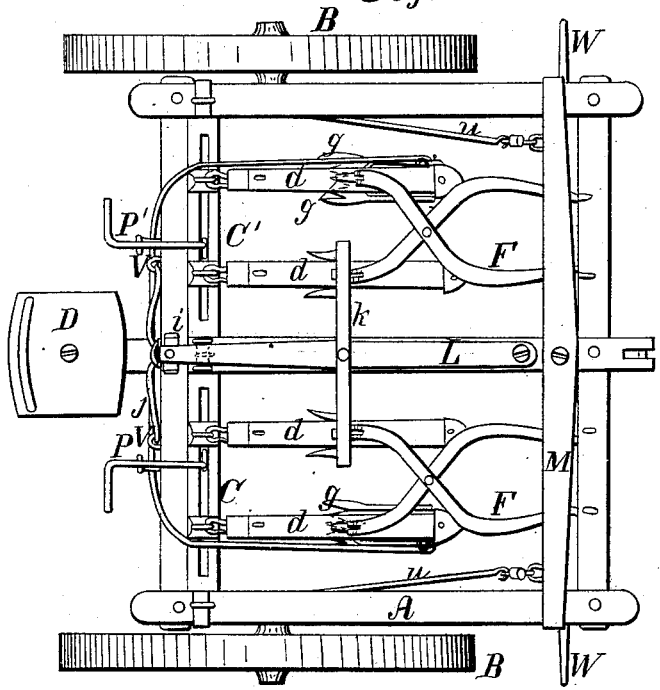
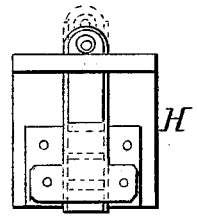
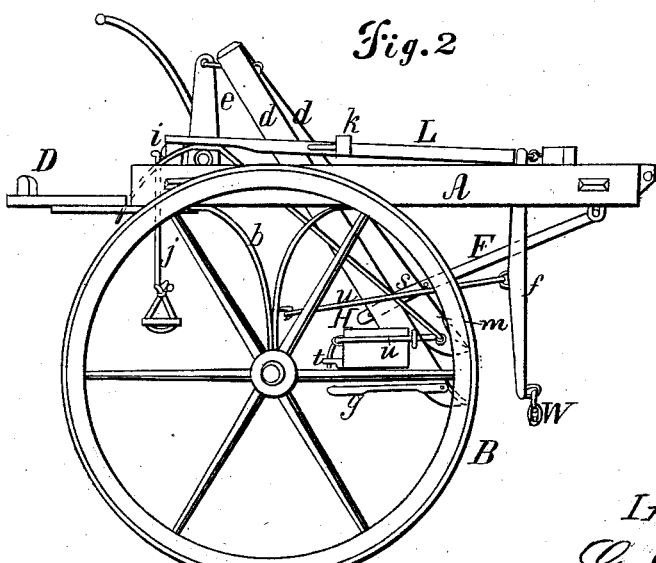
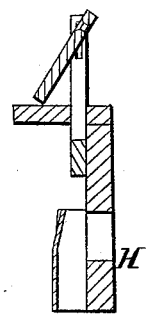
Witnesses
J. Alfred Ellis
G. White
Inventor
G. C. Avery
per L. H. Alexander
Atty.

United States Patent Office.

G. C. AVERY, OF WALDRON, INDIANA.

Letters Patent No. 78,638, dated June 9, 1868.

IMPROVEMENT IN PLOUGH AND PLANTER.

*The Schedule referred to in these Letters Patent and making part of the same.*

TO ALL WHOM IT MAY CONCERN:

Be it known that I, G. C. AVERY, of Waldron, in the county of Shelby, and State of Indiana, have invented certain new and useful Improvements in Combined Plough and Planter; and I do hereby declare that the following is a full, clear, and exact description thereof, reference being had to the accompanying drawings, and to the letters of reference marked thereon, which form a part of this specification, in which—

Figure 1 represents a plan view of my invention,

Figure 2 is a side elevation of the same.

Figure 3 represents a view of the seed-box, and

Figure 4 a vertical section of the same.

The nature of this invention consists in the construction and arrangement of certain devices for drilling and covering grain, in the manner hereinafter set forth.

A represents the frame of my machine. To the bottom of the side-pieces of said frame is attached the metal plate $b$, the said plate being doubled in the middle, so as to form a bearing for the axles of the wheels B B, and then the two ends bolted to the side-pieces of the frame, as seen in fig. 2. $c$ and $c'$ designate two slotted bars, pivoted on the top of frame A, near its rear end. $d\ d\ d$ represent the standards, to which the shovels are attached. Each of the standards $d$ is hinged at top to an arm, $e$, the arms being pivoted at their outer ends in slots in the bars $c$ and $c'$, and the two inner arms being allowed to play with a horizontal motion, so as to throw the plough-beams, to which they are respectively attached, nearer or further apart, as the case may require. In order to keep the lower ends of standards $d$ in position, the braces F F are provided, each brace consisting of cross-bars, (see fig. 1.) The upper ends of said cross-bars are hinged to the bottom of the frame, and their lower ends hinged to the short bars $s\ s$, as seen in fig. 2, the said bars being made to pass through mortises in the standards $d$, and there secured by a key. H designates the seed-boxes, one of which is attached to each of the outside standards $d$. These boxes are furnished with slides $t\ t$, the said slides having holes in them to correspond with the openings in the bottom of the seed-boxes. To the outer ends of the slides $t$ is fastened one end of the rods $n$ the opposite ends of said rods being confined to the standards by staples. To the outer ends of rods $n$, is secured cord $m$, for operating the slides $t$. It will be seen that the slides in both seed-boxes will be operated by the same cord, the upper part of said cord being within reach of the operator. L represents a lever, having its fulcrum on the top of frame A. On the top of lever L is pivoted the cross-bar $k$, which is furnished with two teeth on each side of lever L, the said teeth being intended to embrace the upper end of the two inner standards and keep them in position. The outer end of lever L rests upon the block $i$, and to this block the cord $j$ is attached. The cord $j$ after being secured to block $i$, will have its end passed through the staples V, and their pendent ends formed into a loop to receive the foot of the operator. $p\ p'$ designate two rods, pivoted in slots in the bars $c$ and $c'$, for the purpose of operating said bars. M represents the double-tree, which plays on a bolt that connects it to the centre-piece of frame A. $f\ f'$ represent two wooden bars, each of which is hinged at its upper end to the inner side of the double-tree. The bars $f\ f'$ occupy a vertical position, and have the whiffle-trees $w\ w$ attached to their lower ends. Each of the bars $f\ f'$ is connected with a metal plate, $b$, by an iron rod, $u$, and thus kept in position. For the purpose of covering the grain as it falls from the seed-boxes, the rakes $g$ are pivoted to the standards, directly under the seed-boxes, the said rakes being designed to rise or fall, so as to adapt themselves to the inequalities of the ground. D represents the driver's seat.

In operating my machine, the driver will have the two cords $j$ and $m$ in front of him. By the action of cord $m$ on slide $t$, he can regulate the discharge of grain from the seed-boxes, and by the action of his feet on the pendent ends of cord $j$, he will give a lateral motion to lever L, and cross-bar $k$, and as the teeth on bar $k$ embrace the two inner standards, the said standards can be moved laterally at their lower ends, so as to avoid any obstructions that might be in their way.

One important advantage which I claim in the construction of my machine, is the dispensing with common axle-tree, and supporting the wheels by means of the plates attached to the bottom of the frame, so that when the standards are raised in the manner described, any obstruction likely to be met with will pass under said frame without arresting its motion.

What I claim as my invention, and desire to secure by Letters Patent, is—

1. The combination of the rock-shafts C C', standards d d, and seed-boxes H H, arranged and operating substantially as described.

2. The combination of the rake g, and seed-box H, with the standard d, as set forth.

In testimony that I claim the foregoing as my own, I affix my signature in presence of two witnesses.

G. C. AVERY.

Witnesses:
    FREDERICK W. AVERY,
    GEORGE WRIGHT.